(12) United States Patent
Sato (10) Patent No.: US 6,943,850 B2
(45) Date of Patent: Sep. 13, 2005

(54) OPTICAL APPARATUS AND PROJECTION TYPE DISPLAY APPARATUS FOR REDUCING A PHYSICAL DISTANCE BETWEEN A LIGHT SOURCE AND A DISPLAY

(75) Inventor: Yoshihisa Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 09/952,305

(22) Filed: Sep. 14, 2001

(65) Prior Publication Data

US 2002/0033903 A1 Mar. 21, 2002

(30) Foreign Application Priority Data

Sep. 20, 2000 (JP) .................................... P2000-285643

(51) Int. Cl.$^7$ ................................................ H04N 5/74
(52) U.S. Cl. ........................ 348/781; 349/9; 359/301
(58) Field of Search ................................. 348/744, 781, 348/782; 353/98, 99, 37, 34; 359/298, 489, 301, 629, 485; 349/7–9

(56) References Cited

U.S. PATENT DOCUMENTS

| | | | |
|---|---|---|---|
| 3,508,809 A | 4/1970 | Wilder et al. | |
| 3,677,621 A | 7/1972 | Smith | |
| 5,155,623 A | * 10/1992 | Miller et al. | 359/495 |
| 5,381,278 A | 1/1995 | Shingaki et al. | |
| 5,383,053 A | * 1/1995 | Hegg et al. | 359/486 |
| 5,610,765 A | 3/1997 | Colucci | |
| 6,344,927 B1 | * 2/2002 | Itoh et al. | 359/487 |
| 6,476,880 B2 | * 11/2002 | Tsujikawa et al. | 349/9 |
| 6,563,551 B1 | * 5/2003 | Janssen et al. | 348/759 |
| 6,669,343 B2 | * 12/2003 | Shahzad et al. | 353/20 |
| 2002/0126380 A1 | * 9/2002 | Schuster | 359/485 |

FOREIGN PATENT DOCUMENTS

| | | |
|---|---|---|
| EP | 0 746 164 A | 12/1996 |
| EP | 0 871 054 A | 10/1998 |
| EP | 0 902 329 A | 3/1999 |
| EP | 0 991 281 A | 4/2000 |

* cited by examiner

Primary Examiner—Victor R. Kostak
(74) Attorney, Agent, or Firm—Frommer Lawrence & Haug LLP; Williams S. Frommer; Thomas F. Presson (57) ABSTRACT

An optical apparatus for irradiating light emitted from a light source onto a predetermined object, comprising a polarized light separating optical element for passing a first of two linearly polarized light beams polarized in directions perpendicular to each other and reflecting a second of said two linearly polarized light beams of light emitted from said light source; a phase shifter for converting said first linearly polarized light beams passed from said polarized light separating optical element into substantially circularly polarized light; and a reflecting mirror for reflecting said substantially circularly polarized light passed from said phase shifter back toward and through said phase shifter so that said circulatory polarized light is converted into a third linearly polarized light beam, wherein light emitted from said polarized light separating element, passed through said phase shifter, reflected by said reflecting mirror, and passed back through said phase shifter is irradiated on said predetermined object.

29 Claims, 7 Drawing Sheets

OPTICAL APPARATUS AND PROJECTION TYPE DISPLAY APPARATUS FOR REDUCING A PHYSICAL DISTANCE BETWEEN A LIGHT SOURCE AND A DISPLAY

BACKGROUND OF THE INVENTION

1. Field of the Invention

The present invention relates generally to an optical apparatus for use with a light-providing optical system of a liquid-crystal projector; and more particularly to such an optical apparatus which can be miniaturized.

2. Description of the Related Art

Projection type display apparatus which can generate large-sized pictures by projecting images onto a screen on an enlarged scale have heretofore been widely spread. These large-screen image display apparatus may be used both indoors and outdoors. These projection type display apparatus are roughly classified into two categories. First, a projection type display apparatus (CRT projector) projects light from a fluorescent screen of a CRT onto a screen. Second, light from a light source is modulated by a spatial light modulator element and thereby projected onto a screen. In the latter type of projection type display apparatus, a liquid-crystal panel is typically used as the spatial light modulator.

Figure 7:
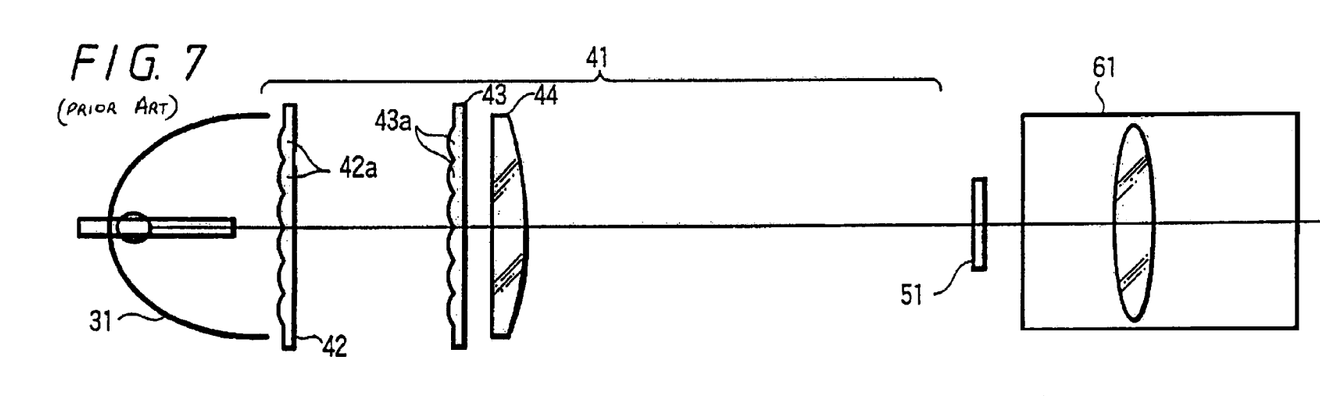
FIG. 7 depicts a conventional single-panel transmission type liquid-crystal projector.

FIG. 7 shows an example of an arrangement of a conventional single-panel transmission type liquid-crystal projector. Light (white natural light) is emitted from a light source 31 and is projected incident on a lighting optical system 41 which introduces this emitted light into a liquid-crystal panel 51. As seen from the side of the light source 31, lighting optical system 41 includes a MLA (multi-lens array) 42, a MLA 43 and a condenser lens 44.

Figure 8:
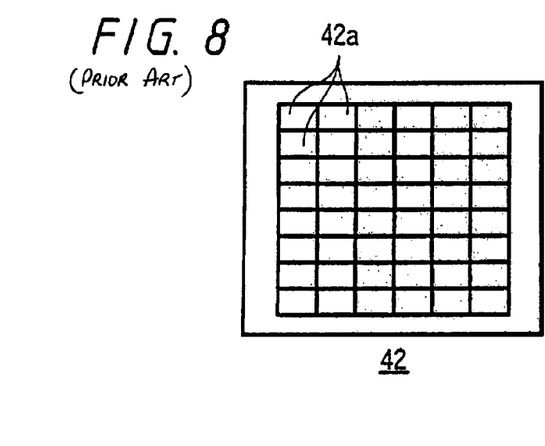
FIG. 8 is a front view showing a multiple lens array of FIG. 7.

MLA array 42 comprises a plurality of small (e.g., typically approximately 1 to 15 mm in diameter) lenses 42a arranged in a two-dimensional array-type fashion as shown in FIG. 8. The shape of lens surface of each lens 42a is rectangular, and is dimensioned to be substantially similar to the aspect ratio of the panel surface of liquid-crystal panel 51. A peripheral portion of light emitted from light source 31 is projected incident on one or more lenses 42a at a peripheral portion of MLA 42. A central portion of light emitted from light source 31 is projected incident on one or more lenses 42a at a central portion of MLA array 42.

MLA 43 is disposed at substantially the focal point position of lenses 42a of MLA 42. MLA 43 comprises a plurality of small lenses 43a arrayed in a two-dimensional fashion in a one-to-one relation to lenses 42a of MLA 42. Light emitted from each respective lens 42a of MLA array 42 is projected respectively incident on the corresponding lens 43a of MLA 43. The combination of MLA 42 and MLA 43 may be referred to as a light integrator.

Light emitted from each lens 43a of MLA 43 is projected incident on condenser lens 44. An optical path length from condenser lens 44 to liquid-crystal panel 51 is substantially equal to a focal length f of condenser lens 44. Light focused by condenser lens 44 is therefore projected incident on the panel surface of the liquid-crystal panel 51.

Multi-lens arrays 42, 43 and condenser lens 44 function to superimpose a central portion and a peripheral portion of light emitted from light source 31 so that light having uniform intensity is projected incident on the entire panel surface of liquid-crystal panel 51.

Liquid-crystal panel 51 is a transmission type liquid-crystal panel employing a TN (twist nematic) liquid-crystal. Incident light that is linearly polarized in one vibration direction passes a polarizing plate (polarizer) on the surface of the incident side of liquid-crystal panel 51 and advances to a liquid-crystal layer. When this linearly polarized light passes through the liquid-crystal layer, the polarizing axis is rotated in response to a voltage level applied to the liquid-crystal layer. The linearly polarized light is passed through an RGB color filter and is detected by a polarizing plate (polarizer) at a surface of an emitting side of liquid-crystal panel 51. Thereafter, light that passes through liquid-crystal panel 51 is projected onto a screen (not shown) through a projection optical system 61.

SUMMARY OF THE INVENTION

As has been determined by the present invention, from a standpoint of reducing the size of such a liquid-crystal projector, condenser lens 44 and liquid-crystal panel 51 should preferably be located as close together as possible so that space between the condenser lens and the liquid-crystal panel is reduced as much as possible. However, there is a limit to the reduction of space between the two because of the required reduction of the focal length of condenser lens 44, as will be described below.

Specifically, assuming that d represents an aperture of condenser lens 44 and that an F number of the condenser lens 44 is F, then the focal length f of condenser lens 44 is expressed as:

$$f = d \times F.$$

Therefore, in order to reduce the focal length of condenser lens 44, the aperture and F number of condenser lens 44 must be decreased.

However, the aperture of condenser lens 44 cannot be made smaller than the apertures of the multi-lens arrays 42 and 43. Furthermore, because a reduction in the F number of condenser lens 44 results in an increase in the angle at which light becomes incident on liquid-crystal panel 51, and further because in a liquid-crystal panel a degree to which contrast is lowered due to pre-tilt becomes remarkable as the incident angle increases, the F number also cannot be reduced to more than a predetermined value. For example, assuming that the diameter of light emitted from light source 31 is 50 mm and that the lower limit of the F number in which contrast can be prevented from being lowered is 2, then the focal length f of the condenser lens 44 is required as shown by f=50×2=100 mm. Therefore, the focal length cannot be reduced to a value less than this.

Figure 9:
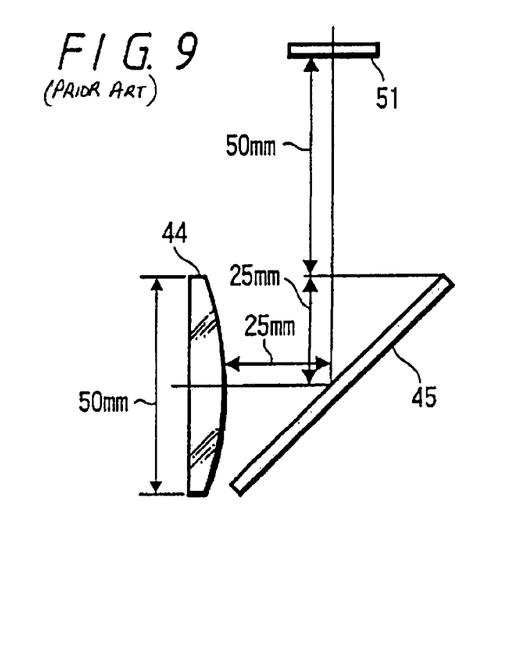
FIG. 9 depicts a single-panel transmission type liquid-crystal projector in which the optical path between the condenser lens and the liquid-crystal panel of FIG. 7 is bent 90°.

Because the focal length of condenser lens 44 cannot be reduced more than a predetermined value as shown in FIG. 9, an optical path between condenser lens 44 and liquid-crystal panel 51 shown in FIG. 7 may be bent 90° by a reflecting mirror 45. However, even with this bent optical path, because the focal length of condenser lens 44 is 100 mm, the total distance from the condenser lens 44 to the left end of reflecting mirror 45 and the distance from the right end of the reflecting mirror 45 to liquid-crystal panel 51 (distance from the right end of reflecting mirror 45 to liquid-crystal panel 51 when the distance from condenser lens 44 to the left end of reflecting mirror 45 is reduced to nearly zero as illustrated) is required to be 50 mm. Therefore, condenser lens 44 and the liquid-crystal panel 51 cannot be located too closely. Hence, as has been recognized by the inventor of the present invention, the above technique cannot contribute to the full miniaturization of such a liquid-crystal projector.

In the projection type display apparatus such as the liquid-crystal projector of FIG. 7 in which light from the light source is focused by the condenser lens and projected incident on the spatial light modulation element (liquid-crystal panel), the projection type display apparatus may be miniaturized by locating the condenser lens and the spatial light modulation element close to each other. Therefore, the size of an optical apparatus can be reduced by locating a light source and an object close to each other.

In accordance with the invention, in an optical apparatus in which light from a light source is irradiated on a predetermined object, an optical apparatus is provided comprising a polarized light separating optical element for passing light from a light source that is linearly polarized and reflecting light polarized in a direction perpendicular to the first direction. A phase shifter is also provided for converting one of the linearly polarized light beams emitted from this polarized light separating optical element into substantially circularly polarized light. A reflecting mirror for reflecting the substantially circularly polarized light emitted from this phase shifter is also provided. Light emitted from the polarized light separating optical element received through the phase shifter after being reflected by the reflecting mirror is irradiated on an object.

In an optical apparatus according to a first embodiment of the invention, light emitted from the light source is separated by the polarized light separating optical element into two linearly polarized light beams that are polarized in a vibration direction perpendicularly to each other. Thereafter, one of the linearly polarized light beams is converted into substantially circularly polarized light by the phase shifter, is reflected by the reflecting mirror, is again converted by the phase shifter (this time, converted into a linearly polarized light beam polarized in a direction perpendicular to the vibration direction of the first linearly polarized light beam), is emitted from the polarized light separating optical element, and is finally irradiated on the object.

In this manner, because light passes twice between the polarized light separating optical element and the reflecting mirror on the optical path from the light source to the object, the optical path is folded, and therefore a short physical distance between the various components. With such a folded path, the necessary optical path length can be maintained between the light source and the object when the light source and the object are located physically close to each other. Thus, the optical apparatus can be miniaturized.

According to an additional embodiment of the invention, a projection type display apparatus is provided including a lighting optical system in which light from a light source is focused by a condenser lens and projected incident on a spatial light modulation element. A projection optical system is also provided for projecting light emitted from this spatial light modulation element onto a screen. Also provided is a projection type display apparatus including a lighting optical system comprising a polarized light separating optical element for passing one of two light beams from a light source that are linearly polarized perpendicularly to each other in the vibration direction and for reflecting the passed linearly polarized light beam emitted from a condenser lens, and a phase shifter for converting one of the linearly polarized light beams emitted from this polarized light separating optical element into substantially circularly polarized light. A reflecting mirror for reflecting the substantially circularly polarized light emitted from this phase shifter back to the phase shifter is also provided. The light emitted from the polarized light separating optical element received through the phase shifter after being reflected by the reflecting mirror is introduced into the spatial light modulation element.

This projection type display apparatus is one in which the first optical apparatus (noted above) is applied to the lighting optical system thereof. Because the optical path is folded, and therefore there is a small physical distance from the condenser lens to the spatial light modulation element, even while the necessary optical path length can be maintained between the condenser lens and the spatial light modulation element, the projection type display apparatus can be made compact in size.

In addition, when such a spatial light modulation element is formed as a transmission type liquid-crystal panel such as a transmission TN liquid-crystal panel having optical rotatory power and double refraction, because one linearly polarized light beam emitted from the polarized light separating optical element is projected incident on the liquid-crystal panel, a polarizing plate (polarizer) need not be attached to the surface of the incident side of the liquid-crystal panel. Accordingly, the number of optical elements comprising the liquid-crystal panel can be decreased and the process of producing the liquid-crystal panel can be simplified.

Furthermore, in accordance with a further embodiment of the invention, an optical apparatus is presented in which light from a light source is irradiated on a predetermined object. The optical apparatus comprises a polarized light separating optical element, as described above, a first phase shifter for converting one of the linearly polarized light beams emitted from the polarized light separating optical element into substantially circularly polarized light, and a first reflecting mirror for reflecting the substantially circularly polarized light emitted from the first phase shifter back toward the first phase shifter. Also provided is a second phase shifter for converting the other linearly polarized light beam emitted from the polarized light separating optical element into substantially circularly polarized light, and a second reflecting mirror for reflecting the substantially circularly polarized light emitted from the second phase shifter back toward the second phase shifter. The light emitted from the polarized light separating optical element, received from the first phase shifter after having been reflected back by the first reflecting mirror and the light emitted from the polarized light separating optical element received through the second phase shifter after having been reflected back by the second reflecting mirror, are irradiated on the object.

In such an optical apparatus, light from the light source is separated by the polarized light separating optical element into two linearly polarized light beams having directions of polarization in the vibration direction that are perpendicular to each other. Then, one linearly polarized light beam is converted by the first phase shifter into substantially circularly polarized light, is reflected by the first reflecting mirror back to the first phase shifter, is again converted by the first phase shifter (this time, converted into linearly polarized light perpendicular to the vibration direction), and is emitted from the polarized light separating optical element and irradiated on the object. Furthermore, the other linearly polarized light beam separated by the polarized light separating optical element is converted by the second phase shifter into substantially circularly polarized light, is reflected by the second reflecting mirror back to the second phase shifter, is again converted by the second phase shifter (this time, converted into linearly polarized light perpendicular to the vibration direction), and is emitted from the polarized light separating optical element and irradiated on the object.

Because light passes through the polarized light separating optical element twice, in accordance with the positioning of the reflecting mirror in the optical path between the light source and the object, the optical path is folded to be short in length. Thus, because the necessary optical path length can be maintained between the light source and the object even if the light source and the object are located physically close to each other, the optical apparatus can be miniaturized.

In addition, because the two linearly polarized light beams that are polarized in the vibration direction in directions perpendicular to each other are both irradiated on the object, a desired illuminance level of light irradiated on the object can be maintained.

Additionally, in accordance with a further embodiment of the invention, a projection type display apparatus is provided including a lighting optical system in which light from a light source is focused by a condenser lens and projected incident on a spatial light modulation element, and a projection optical system for projecting light emitted from this spatial light modulation element into a screen. The projection type display apparatus comprises a polarized light separating optical element, as described above, a first phase shifter for converting the first linearly polarized light beam emitted from the polarized light separating optical element into substantially circularly polarized light, and a first reflecting mirror for reflecting the substantially circularly polarized light beam emitted from this first phase shifter back toward this first phase shifter. Also provided is a second phase shifter for converting the other linearly polarized light beam emitted from the polarized light separating optical element into substantially circularly polarized light and a second reflecting mirror for reflecting the substantially circularly polarized light emitted from this second phase shifter back toward this second phase shifter. Light emitted from this polarized light separating optical element through the first phase shifter after having been reflected by the first reflecting mirror and light emitted from this polarized light separating optical element through the second phase shifter after having been reflected by this second reflecting mirror are projected incident on the spatial light modulation element.

This projection type display apparatus is such one in which the second optical apparatus according to the present invention is applied to the lighting optical system. When the optical path is folded, the physical length on the optical path from the condenser lens to the spatial light modulation element is short because the necessary optical path can be maintained between the condenser lens and the spatial light modulation element even though the condenser lens and the spatial light modulation element are located physically close to each other. Thus, the projection type display apparatus can be miniaturized.

In addition, when this spatial light modulation element does not have optical rotatory power and double refraction, since two linearly polarized light beams that are perpendicular to each other in the vibration direction are both incident on the spatial light modulation element, a desired luminance of an object can be maintained.

The invention accordingly comprises the several steps and the relation of one or more of such steps with respect to each of the others, and the apparatus embodying features of construction, combination(s) of elements and arrangement of parts that are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DESCRIPTION OF THE PREFERRED EMBODIMENTS

A mode for carrying out the present invention will be described below with reference to the drawings.

Figure 1:
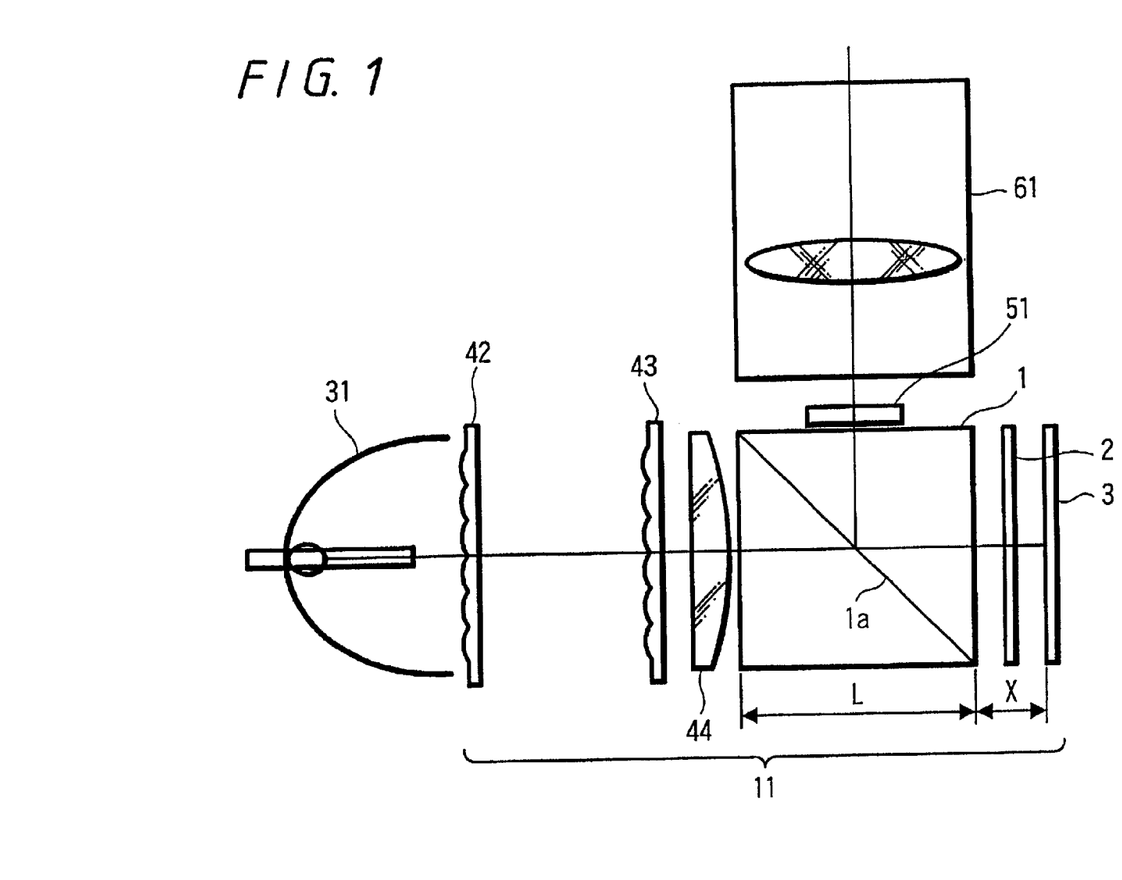
FIG. 1 depicts an arrangement of a single-panel transmission type liquid-crystal projector constructed in accordance with a first embodiment of the invention.

Referring first to FIG. 1, a liquid-crystal projector constructed in accordance with a first embodiment of the invention is shown. This liquid-crystal projector comprises a single-panel transmission type liquid-crystal projector. Elements similar to those already described with reference to FIG. 7 are indicated using the same reference numerals.

A lighting optical system 11 of the one-panel transmission type liquid-crystal projector depicted in FIG. 1 comprises, in addition to an MLA 42, an MLA 43 and a condenser lens 44 (having an aperture of approximately 50 mm and an F-number of approximately 2,) a PBS (polarizing beam splitter) 1 for passing P polarized light and reflecting S polarized light emitted from condenser lens 44. A quarter-wave plate 2 for converting P polarized light passed through PBS 1 into circularly polarized light, and a reflecting mirror 3 for reflecting the circularly polarized light emitted from quarter-wave plate 2 back toward quarter-wave plate 2 are also provided.

Figure 2:
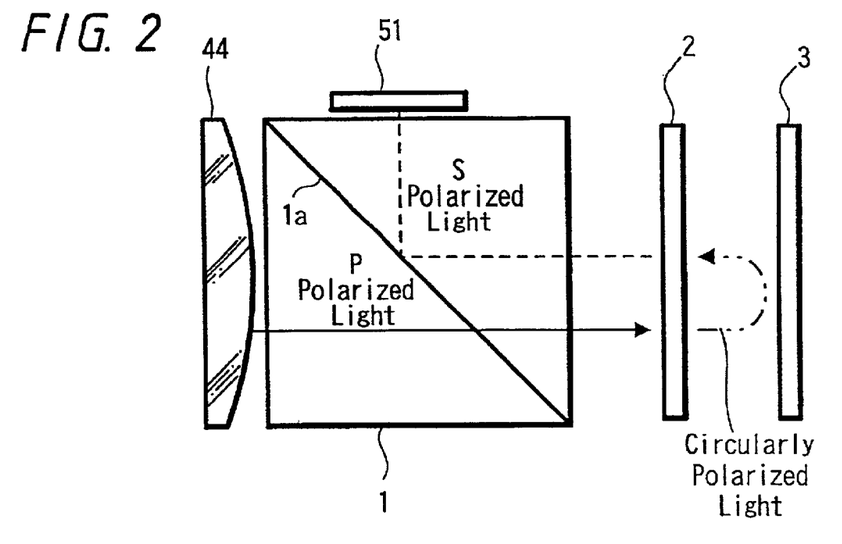
FIG. 2 depicts an optical path of a light beam incident on the liquid-crystal panel of FIG. 1.

As shown in FIG. 2, P polarized light emitted from condenser lens 44 passes through PBS 1 and is converted by quarter-wave plate 2 into circularly polarized light. This circularly polarized light is then reflected by reflecting mirror 3 back towards quarter-wave plate 2 and is again converted by quarter-wave plate 2. This time it is converted into the S polarized light, and is finally reflected by PBS 1 and projected incident onto liquid-crystal panel 51.

PBS 1 is formed as a cube in which, in a preferred embodiment, a length "L" of one side is approximately 50 mm, corresponding to the aperture of condenser lens 44. The PBS cube is formed by bonding right-angled isosceles triangle prisms with a polarized light separating layer 1a formed on the slanting surface thereof and made of glass whose refractive index "n" is approximately 1.5. A distance "X" between PBS 1 and reflecting mirror 3 is set to be about 16.5 mm.

Furthermore, a distance between condenser lens 44 and PBS 1 and a distance between PBS 1 and liquid-crystal panel 51 are set to be nearly zero. Accordingly, condenser lens 44 and liquid-crystal panel 51 are located considerably physically close to each other.

In such single-panel transmission type projector, within the optical path from condenser lens 44 to liquid-crystal panel 51, light passes through the PBS 1 twice, being reflected by reflecting mirror 3 as shown in FIG. 2, whereby the optical path is folded so the components can be located physically close to each other. An optical path length at this folded portion of the apparatus is calculated by the following equation:

Path length=$(L/n+X)\times 2$

=$(50/1.5+16.5)\times 2$ 100 mm

This optical path length of 100 mm is equal to the focal length of condenser lens 44 having an aperture of about 50 mm and whose F number is 2 (i.e., necessary optical path length between the condenser lens 44 and the liquid-crystal panel 51).

As described above, in accordance with this single-panel transmission type liquid-crystal projector, unlike the conventional single-panel transmission type liquid-crystal projector shown in FIG. 7 and the conventional liquid-crystal projector in which the optical path is bent 90° between condenser lens 44 and liquid-crystal panel 51 as shown in FIG. 9, because the optical path is folded from condenser lens 44 to liquid-crystal panel 51, the necessary optical path length can be maintained between condenser lens 44 and liquid-crystal panel 51 even if condenser lens 44 and liquid-crystal panel 51 are physically located very close to each other. As a consequence, the lighting optical system 11 can be miniaturized, and the entire single-panel transmission type liquid-crystal projector can be made compact in size.

In addition, because only S polarized light is incident on liquid-crystal panel 51, a polarizing plate (polarizer) need not be attached to the surface of the incident side of liquid-crystal panel 51. Accordingly, the number of optical elements comprising the liquid-crystal panel 51 can be decreased and production of liquid-crystal panel 51 can be simplified.

Figure 3:
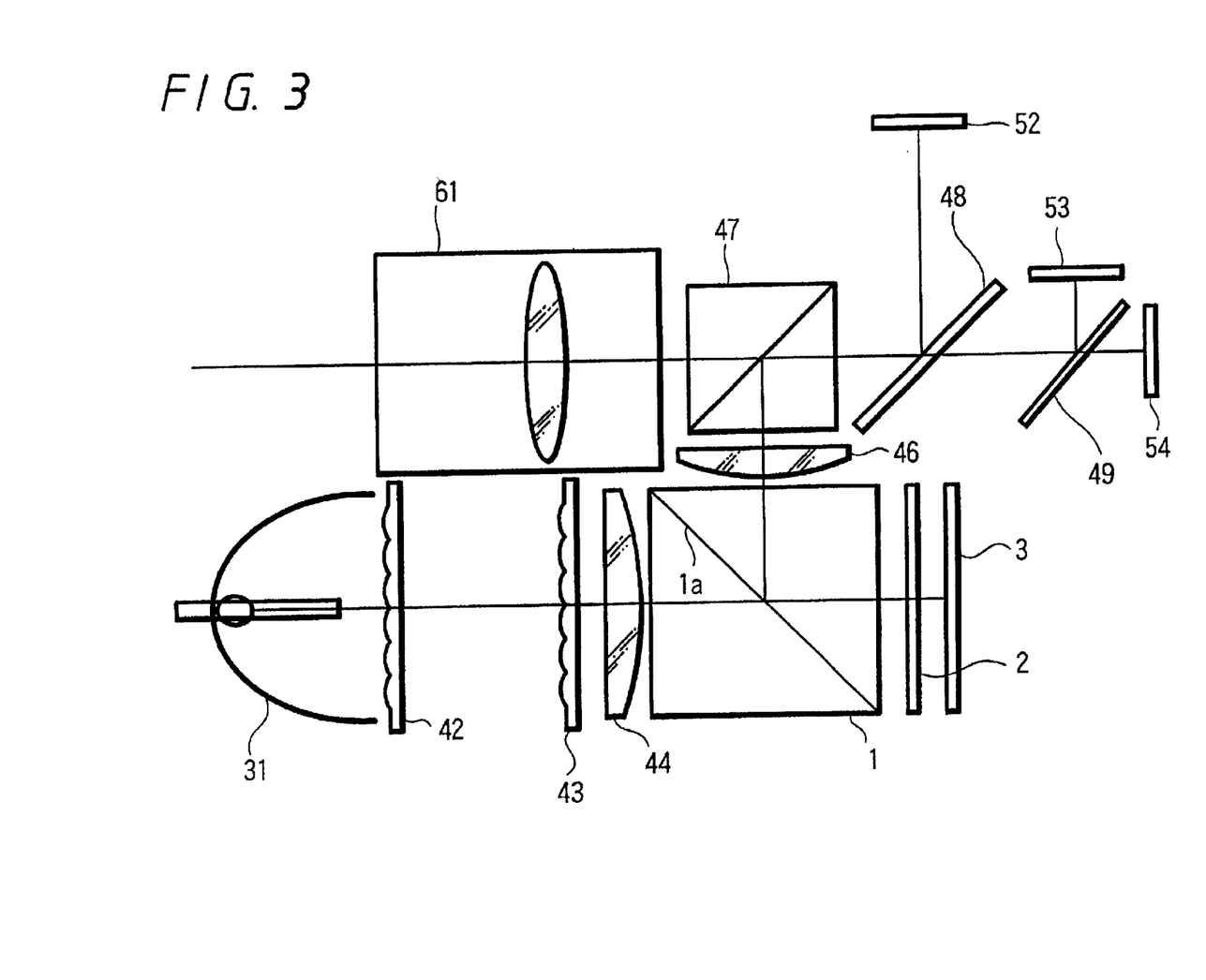
FIG. 3 depicts an arrangement of a three-panel reflection type liquid-crystal projector constructed in accordance with a second embodiment of the invention.

While FIG. 1 shows the single-panel transmission type liquid-crystal projector, the first optical apparatus shown in FIG. 2 can also be applied to a lighting optical system of a reflection type liquid-crystal projector. FIG. 3 shows an example of an arrangement of a three-panel reflection type liquid-crystal projector constructed in accordance with a second embodiment of the invention to which this first optical apparatus is applied.

In this three-panel reflection type liquid-crystal projector, S polarized light emitted from PBS 1 is again focused by a condenser lens 46 located without a substantial distance between it and PBS 1, reflected by a PBS 47, separated into lights of RGB by color decomposing and synthesizing elements 48, 49 and then projected incident on reflection type liquid-crystal panels 52, 53, 54 formed of TN liquid-crystals. In liquid-crystal panels 52, 53, 54, a polarizing axis of this S polarized light is rotated in response to the level of an applied voltage corresponding to respective RGB video signals. Then, light beams reflected from liquid-crystal panels 52, 53, 54 are synthesized by color decomposing and synthesizing elements 48, 49 and only P polarized light is passed back through PBS 47 and projected onto a screen (not shown) through a projection optical system 61. Therefore, distance between the PBS 1 and the reflecting mirror 3 in FIG. 3 is set in such a manner that an optical path length of light which passes through PBS 1 twice, via reflecting mirror 3 becomes equal to a required optical path length between condenser lens 44 and condenser lens 46.

Figure 10:
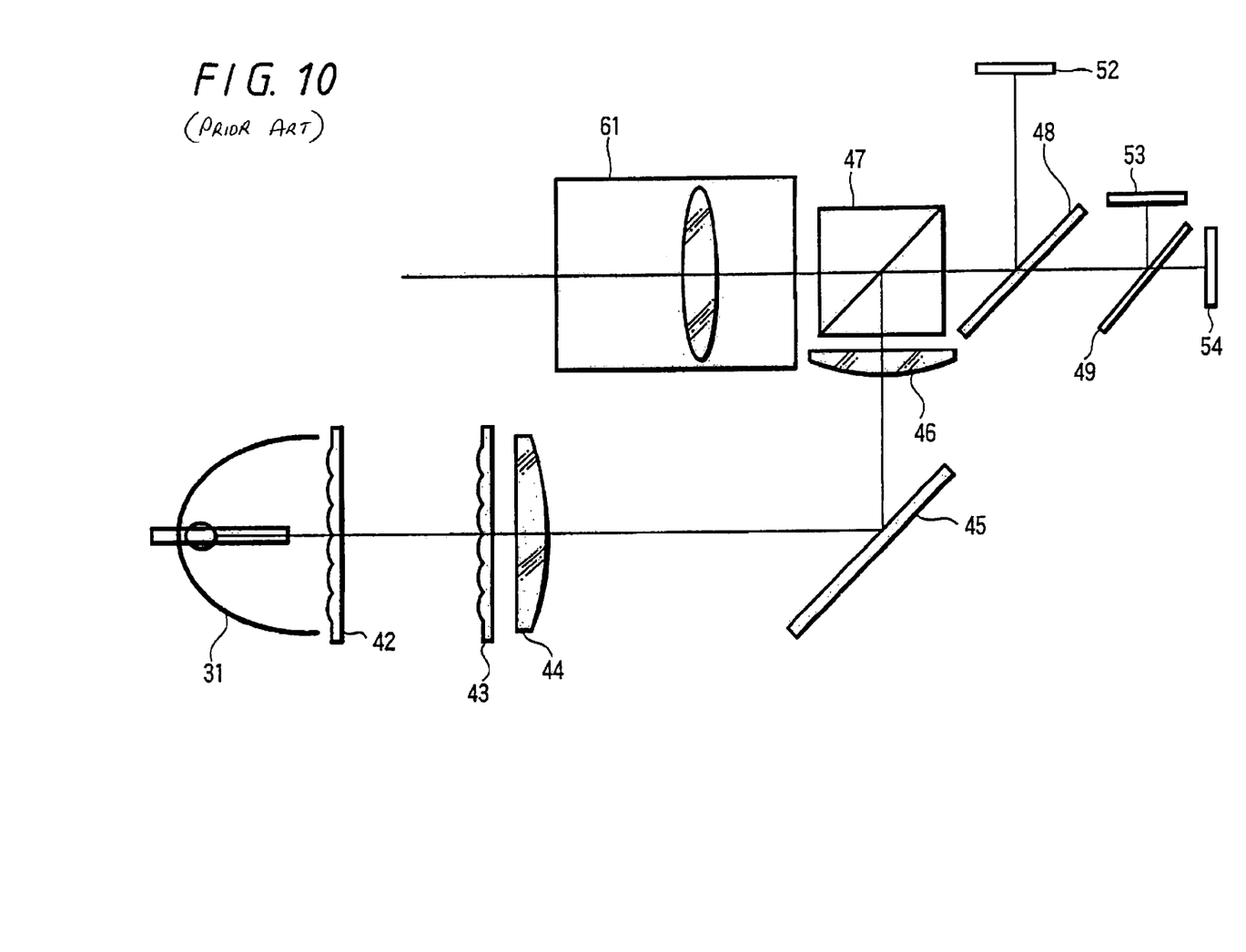
FIG. 10 depicts a conventional three-panel reflection type liquid-crystal projector.

As noted above, FIG. 10 shows a conventional three-panel reflection type liquid-crystal projector, and is presented in contrast with the three-panel reflection type liquid-crystal projector of FIG. 3 constructed in accordance with the invention. Because the optical path in FIG. 10 is bent 90° between condenser lens 44 and condenser lens 46 by the reflecting mirror 45, similarly to the case of FIG. 9, condenser lens 44 and condenser lens 46 cannot be located too close to each other.

On the other hand, in the three-panel reflection type liquid-crystal projector of FIG. 3 constructed in accordance with the invention, because the optical path is folded, and therefore the physical distance is short along the optical path from condenser lens 44 to condenser lens 46, the necessary optical path length can be maintained between condenser lens 44 and condenser lens 46 even if condenser lens 44 and condenser lens 46 are located physically very close to each other. As a result, the size of the three-panel reflection type liquid-crystal projector can be miniaturized.

Figure 4:
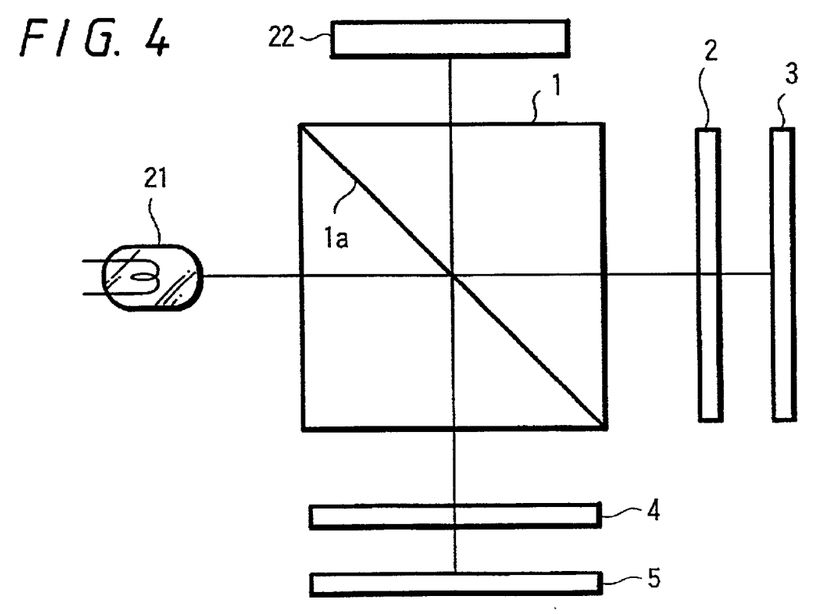
FIG. 4 depicts a fundamental arrangement of an optical apparatus in accordance with the invention.

Next, FIG. 4 depicts an arrangement of an optical apparatus constructed in accordance with a third embodiment of the invention. In the optical apparatus of this third embodiment, light from a light source 21 is irradiated on a predetermined object 22. Between light source 21 and object 22, in addition to PBS 1, quarter-wave plate 2 and reflecting mirror 3 shown in FIG. 1, there are also provided a quarter-wave plate 4 for converting S polarized light reflected from PBS 1 into circularly polarized light and a reflecting mirror 5 for reflecting circularly polarized light emitted from quarter-wave plate 4 back toward quarter-wave plate 4. A distance between PBS 1 and reflecting mirror 3 and a distance between PBS 1 and reflecting mirror 5 are set to be equal to each other.

Figure 5A:
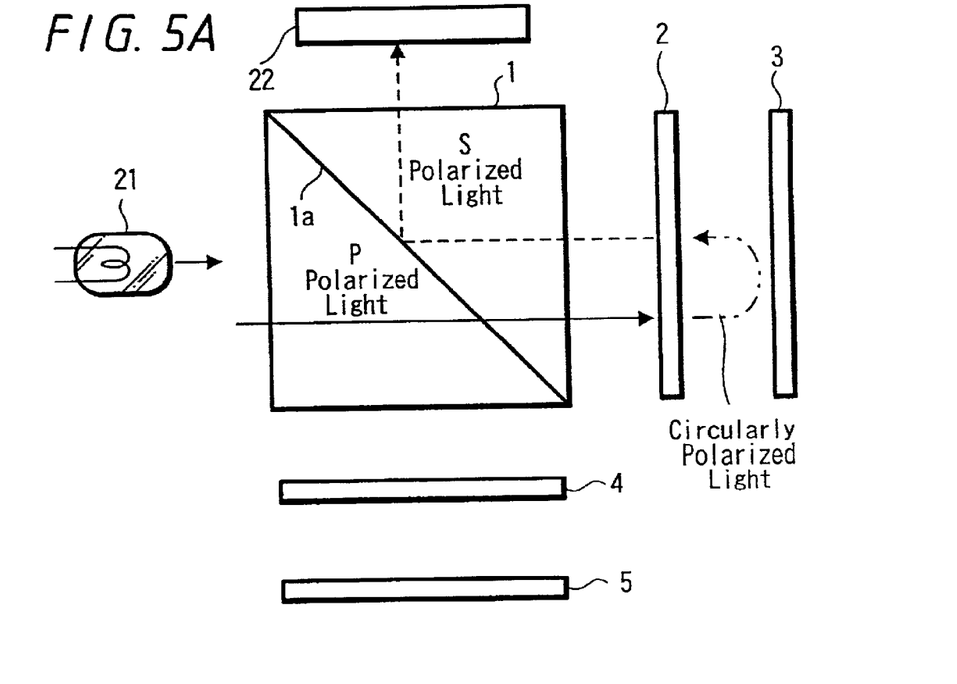
FIGS. 5A and 5B depict optical paths of light irradiated on an object of FIG. 4.
Figure 5B:
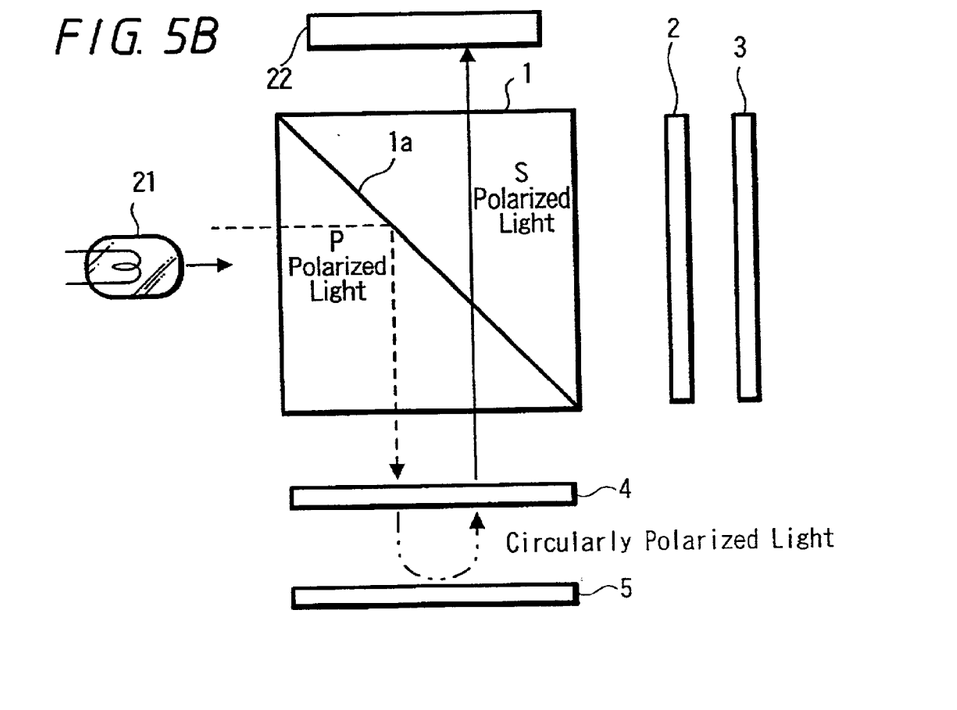

As shown in FIG. 5A, P polarized light emitted from light source 21, passes through PBS 1 and is converted into circularly polarized light by quarter-wave plate 2. This circulatory polarized light is then reflected by reflecting mirror 3, is again converted into S polarized light by quarter-wave plate 2, reflected by PBS 1 and irradiated on object 22. As shown in FIG. 5B, S polarized light emitted from light source 21 is reflected by the PBS 1 and is also converted into circularly polarized light by quarter-wave plate 4. This circularly polarized light is then reflected by reflecting mirror 5, is again converted into P polarized light by quarter-wave plate 4, passes through PBS 1 and is irradiated on object 22. Because the distance between PBS 1 and reflecting mirror 3 and the distance between PBS 1 and reflecting mirror 5 are equal to each other, the optical path lengths of the two irradiated light beams from light source 21 to object 22 become equal to each other.

Also, in this optical apparatus shown in FIG. 4, because the optical path is folded from light source 21 to object 22, the necessary optical path length can be maintained between light source 21 and object 22, thereby making it possible to miniaturize the optical apparatus. In addition, because P polarized light and S polarized light are both irradiated on the object, illuminance of light irradiated on the object can be maintained at a desired level.

When a lighting optical system of a projection type display apparatus such as a polymer dispersion liquid-crystal panel (liquid-crystal panel which becomes opaque without application of a drive voltage and which becomes transparent with application of a drive voltage) and a DMD manufactured by Texas Instruments using a spatial light modulation element which does not have optical rotatory power and double refraction is provided with this second optical apparatus similarly to FIGS. 1 and 3, the projection type display apparatus can be miniaturized. In addition, because both P polarized light and S polarized light are introduced into the spatial light modulation element, luminance levels can be maintained. Further, when a projection optical system of an exposure apparatus for manufacturing semiconductors, for example, is provided with this second optical apparatus, the exposure apparatus can be miniaturized. In addition, exposure power can be maintained.

Figure 6:
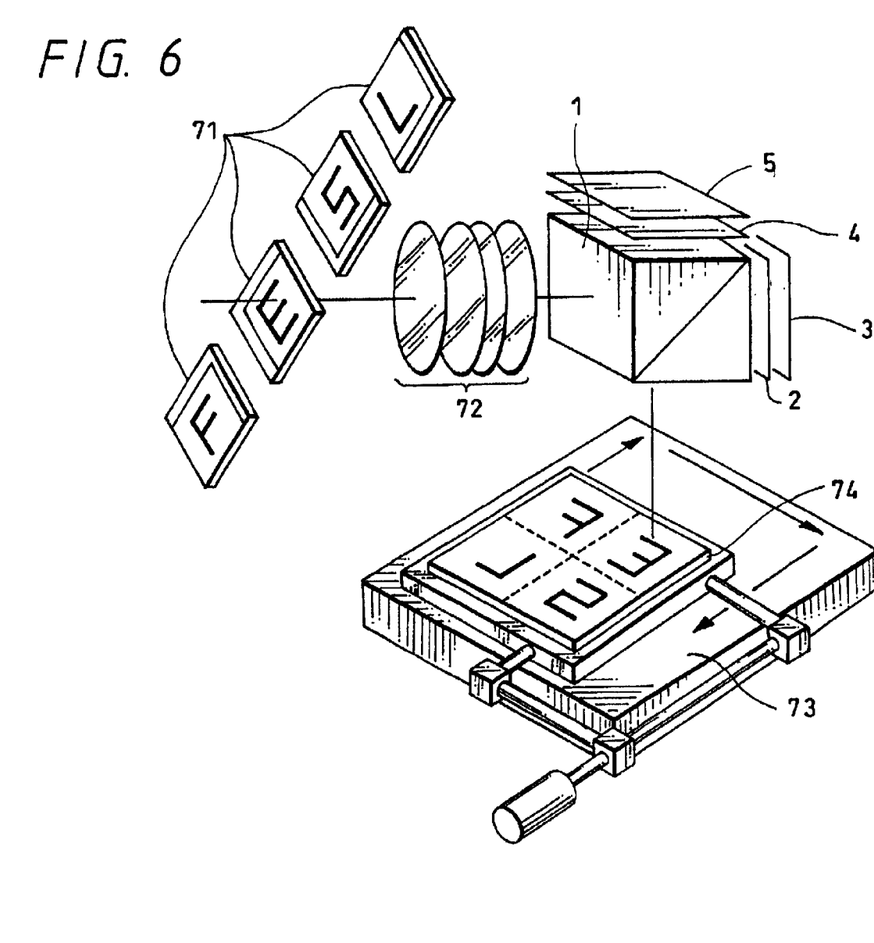
FIG. 6 depicts an exposure apparatus constructed in accordance with the invention.

FIG. 6 depicts an arrangement of a reduction projection exposure apparatus constructed in accordance with a fourth embodiment of the invention in which a projection optical system, such as that of FIG. 4, is provided. Light emitted from a light source, not shown, such as an extra-high-voltage mercury lamp, for example, is projected incident on a reduction lens 72 through a reticle (small mask) 71. Reticle 71 may comprise letters or other designs to be projected onto glass substrate 74. Appropriate relative movement of reticle 71, lens 72 and stage 73 allow for proper exposure of glass substrate 74. Light emitted from reduction lens 72 is passed through PBS 1, quarter-wave plates 2, 4 and reflecting mirrors 3 and 5 and then irradiated on a glass substrate 74 on a stage 73. Also in the reduction projection exposure apparatus shown in FIG. 6, an optical path is folded from reduction lens 72 to glass substrate 74, whereby a necessary optical path length can be maintained between the reduction lens 72 and glass substrate 74 even if reduction lens 72 and stage 73 are located physically close to each other. As a consequence, the reduction projection exposure apparatus can be miniaturized.

In the examples shown in FIGS. 1 and 3, there are provided quarter-wave plate 2 for converting P polarized light passed through PBS 1 into circularly polarized light and reflecting mirror 3 for reflecting circularly polarized light emitted from the quarter-wave plate 2 back toward the quarter-wave plate 2. However, the liquid-crystal projector may include a quarter-wave plate for converting S polarized light reflected by PBS 1 into circularly polarized light and a reflecting mirror for reflecting the circularly polarized light emitted from the quarter-wave plate back toward the quarter-wave plate. In this case, the S polarized light reflected by PBS 1 is converted into circularly polarized light by this quarter-wave plate. The S polarized light is then reflected by the reflecting mirror, again converted into P polarized light by the quarter-wave plate, is passed through PBS 1 and then projected incident on the liquid-crystal panel 51 in FIG. 1 or the condenser lens 46 in FIG. 3.

While the PBS for passing S polarized light and which reflects P polarized light is used as the optical element for separating light from the light source into P polarized light and S polarized light in the above respective examples, there may be used a PBS for passing S polarized light and which reflects P polarized light. Alternatively, the PBS may be replaced with a polarizing plate for reflecting one of P polarized light and S polarized light and which passes the other. Such polarizing plate may be such one which is manufactured under the trade name of "HMF" (Heat Management Film) by 3M.

While the first optical apparatus (first embodiment) according to the present invention is applied to the liquid-crystal projector using the TN liquid-crystal panel (second embodiment) and the second optical apparatus (third embodiment) according to the present invention is applied to the projection type display apparatus using the spatial light modulation element having neither optical rotatory power nor double refraction and the exposure apparatus for manufacturing semiconductors (fourth embodiment) in the above examples, the present invention is not limited thereto and the first and second optical apparatus may both be applied to proper optical apparatus which irradiates light from a light source on an object.

The present invention is not limited to the above embodiments and can take various other modifications without departing from the gist of the present invention.

As described above, according to the first optical apparatus of the present invention, because the optical path is folded from the light source to the object, even if the light source and the object are located physically close to each other, the necessary optical path length can be maintained between the light source and the object. Hence, the optical apparatus can be miniaturized.

Next, according to the projection type display apparatus of the present invention (projection type display apparatus in which the first optical apparatus according to the present invention is applied to the lighting optical system), because the optical path is folded from the condenser lens to the spatial light modulation element, even if the condenser lens and the spatial light modulation element are located physically close to each other, the necessary optical path length can be maintained between the condenser lens and the spatial light modulation element. Hence, the projection type display apparatus can be miniaturized.

In addition, when the spatial light modulation element, for example, is a transmission type liquid-crystal panel such as the transmission type TN liquid-crystal panel having optical rotatory power and double refraction, because only one linearly polarized light emitted from the polarization separating optical element is projected incident on the liquid-crystal panel, the polarizing plate need not be attached to the surface of the incident side of the liquid-crystal panel. Therefore, the number of optical elements comprising the liquid-crystal panel can be reduced and the production of the liquid-crystal panel can be simplified.

According to the second optical apparatus of the present invention, because two linearly polarized light beams that are polarized in directions perpendicular to each other are both irradiated on the object, the luminance levels of light irradiated on the object can be maintained.

Next, according to the projection type display apparatus of the present invention (the projection type display apparatus in which the second optical apparatus according to the present invention is applied to the lighting optical system), the projection type display apparatus can be miniaturized.

In addition, when the spatial light modulation element does not have optical rotatory power and double refraction, because two linearly polarized light beams that are polarized in directions perpendicular to each other are both introduced into the spatial light modulation element, that luminance level can be maintained.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical apparatus for irradiating light emitted from a light source onto a predetermined object, comprising:
   a polarized light separating optical element for receiving the light beam emitted from the light source and for passing said light beam after being linearly polarized in a first direction and reflecting said light beam after being linearly polarized in a second direction perpendicular to the first direction;
   a phase shifter for converting said light beam that is linearly polarized in the first direction and passed from said polarized light separating optical element into substantially circularly polarized light;
   a reflecting mirror for reflecting said substantially circularly polarized light passed from said phase shifter back toward and through said phase shifter so that said circularly polarized light is linearly polarized in the second direction, wherein light emitted from said polarized light separating element, after having passed through said phase shifter, having been reflected by said reflecting mirror, and having passed back through said phase shifter is reflected by the polarized light separating optical element irradiated on said predetermined object;
   a light integrator positioned between said light source and said polarized light-separating optical element; and
   a condenser lens positioned between said polarized light separating optical element and said light integrator;
   wherein said predetermined object is a spatial light modulator, and an optical path length from said condenser lens to said spatial modulator is substantially equal to a focal length of said condenser lens so as to superimpose a central portion and a peripheral portion of said light emitted from the light source.

2. The optical apparatus of claim 1, further comprising a second condenser lens positioned between said polarized light separating element and said spatial light modulator.

3. The optical apparatus of claim 1, further comprising:
   a second polarized light separating optical element positioned between said polarized light separating optical element and said spatial light modulator; and
   a second condenser lens positioned between said polarized light separating optical element and said second polarized light separating optical element;
   wherein said spatial light modulator comprises a reflection type LCD panel.

4. The optical apparatus of claim 1, wherein said polarizing light separating element is a polarizing beam splitter.

5. The optical apparatus of claim 1, wherein said polarizing light separating element is a polarizing plate.

6. The optical apparatus of claim 1, wherein said predetermined object is a substrate.

7. The optical apparatus of claim 6, wherein said light from said light source is passed through a mask target using a projection optical means;
   wherein said substrate is exposed in accordance with a projection pattern of said mask target.

8. A projection type display apparatus including a lighting optical system in which light emitted from a light source is focused by a condenser lens, and made incident on a spatial light modulator and a projection optical system for projecting light emitted from said spatial light modulator onto a screen, said lighting optical system comprising:
   a polarized light separating optical element for receiving the light beam emitted from the light source, and for passing said light beam after being linearly polarized in a first direction and reflecting said light beam after being linearly polarized in a second direction perpendicular to the first direction;
   a phase shifter for converting said light beam that is linearly polarized in the first direction, and passed from said polarized light separating optical element 1 into substantially circularly polarized light; and
   a reflecting mirror for reflecting said substantially circularly polarized light passed from said phase shifter back toward and through said phase shifter so that said circularly polarized light is linearly polarized in the second direction wherein light emitted from said polarized light separating element, after having passed through said phase shifter, having been reflected by said reflecting mirror, and having passed back through said phase shifter is reflected by the polarized light separating optical element irradiated on said predetermined object;
   a light integrator positioned between said light source and said polarized light-separating optical element; and
   a condenser lens positioned between said light source and said light integrator;
   wherein said predetermined object is a spatial light modulator, and an optical path length from said condenser lens to said spatial modulator is substantially equal to a focal length of said condenser lens so as to superimpose a central portion and a peripheral portion of said light emitted from the light source.

9. The projection type display apparatus of claim 8, further comprising a second condenser lens positioned between said polarized light separating element and said spatial light modulator.

10. The projection type display apparatus of claim 8, further comprising:
    a second polarized light separating optical element positioned between said polarized light separating optical element and said spatial light modulator; and
    a second condenser lens positioned between said polarized light separating optical element and said second polarized light separating optical element;
    wherein said spatial light modulator comprises a reflection type LCD panel.

11. The projection type display apparatus of claim 8, wherein said polarizing light separating element is a polarizing beam splitter.

12. The projection type display apparatus of claim 8, wherein said polarizing light separating element is a polarizing plate.

13. The projection type display apparatus of claim 8, wherein said predetermined object is a substrate.

14. The projection type display apparatus of claim 13, wherein said light from said light source is passed through a mask target using a projection optical means;
    wherein said substrate is exposed in accordance with a projection pattern of said mask target.

15. An optical apparatus for irradiating light from a light source to a predetermined object, comprising:

a polarized light separating optical element for passing a first of two linearly polarized light beams polarized in directions perpendicular to each other and reflecting a second of said two linearly polarized light beams emitted from said light source;

a first phase shifter for converting said first of said two linearly polarized light beams passed from said polarized light separating optical element into substantially circularly polarized light;

a first reflecting mirror for reflecting said substantially circularly polarized light passed from said first phase shifter back toward and through said first phase shifter;

a second phase shifter for converting said second of said two linearly polarized light beams passed from said polarized light separating optical element into substantially circularly polarized light; and a second reflecting mirror for reflecting said substantially circularly polarized light beams passed from said second phase shifter back toward and through said second phase shifter, wherein light emitted from said polarized light separating optical element, passed through said first phase shifter, reflected by said first reflecting mirror, and passed back through said first phase shifter, and light emitted from said polarized light separating optical element, passed through said second phase shifter, reflected by said second reflecting mirror, and passed back through said second phase shifter are irradiated on said predetermined object.

16. The optical apparatus of claim 15, wherein said light beam reflected by said first reflecting mirror back through said first phase shifter and said light beam reflected by said second reflecting mirror back through said second phase shifter are polarized in directions substantially perpendicular to each other.

17. The optical apparatus of claim 15, further comprising:

a light integrator positioned between said light source and said polarized light-separating optical element; and a condenser lens positioned between said light source and said light integrator;

wherein said predetermined object is a spatial light modulator.

18. The optical apparatus of claim 17, further comprising a second condenser lens positioned between said polarized light separating element and said spatial light modulator.

19. The optical apparatus of claim 17, further comprising:

a second polarized light separating optical element positioned between said polarized light separating optical element and said spatial light modulator; and a second condenser lens positioned between said polarized light separating optical element and said second polarized light separating optical element;

wherein said special light modulator comprises a reflection type LCD panel.

20. The optical apparatus of claim 15, wherein said polarizing light separating element is a polarizing beam splitter.

21. The optical apparatus of claim 15, wherein said polarizing light separating element is a polarizing plate.

22. The optical apparatus of claim 15, wherein said predetermined object is a substrate.

23. The optical apparatus of claim 22, wherein said light from said light source is passed through a mask target using a projection optical means;

wherein said substrate is exposed in accordance with a projection pattern of said mask target.

24. A projection type display apparatus including a lighting optical system in which light from a light source is focused by a condenser lens and made incident on a spatial light modulator and a projection optical system for projecting light emitted from said spatial light modulator onto a screen, said lighting optical system comprising:

a polarized light separating optical element for passing a first of two linearly polarized light beams polarized in directions perpendicular to each other and reflecting a second of said two linearly polarized light beams emitted from said light source;

a first phase shifter for converting said first of said two linearly polarized light beams passed from said polarized light separating optical element into substantially circularly polarized light;

a first reflecting mirror for reflecting said substantially circularly polarized light passed from said first phase shifter back toward and through said first phase shifter;

a second phase shifter for converting said second of said two linearly polarized light beams passed from said polarized light separating optical element into substantially circularly polarized light; and a second reflecting mirror for reflecting said substantially circularly polarized light beams passed from said second phase shifter back toward and through said second phase shifter, wherein light emitted from said polarized light separating optical element, passed through said first phase shifter, reflected by said first reflecting mirror, and passed back through said first phase shifter, and light emitted from said polarized light separating optical element, passed through said second phase shifter, reflected by said second reflecting mirror, and passed back through said second phase shifter are irradiated on said predetermined object.

25. The projection type display apparatus of claim 24, wherein said light beam reflected by said first reflecting mirror back through said first phase shifter and said light beam reflected by said second reflecting mirror back through said second phase shifter are polarized in directions substantially perpendicular to each other.

26. The projection type display apparatus of claim 24, wherein said polarizing light separating element is a polarizing beam splitter.

27. The projection type display apparatus of claim 24, wherein said polarizing light separating element is a polarizing plate.

28. The projection type display apparatus of claim 24, wherein said predetermined object is a substrate.

29. The projection type display apparatus of claim 28, wherein said light from said light source is passed through a mask target using a projection optical means;

wherein said substrate is exposed in accordance with a projection pattern of said mask target.

\* \* \* \* \*